US011054830B2

(12) United States Patent
Anderson et al.

(10) Patent No.: US 11,054,830 B2
(45) Date of Patent: Jul. 6, 2021

(54) FUEL CELL POWERED AUTONOMOUS VEHICLE

(71) Applicant: Anderson Industries, LLC, Webster, SD (US)

(72) Inventors: Kory Anderson, West Fargo, ND (US); Daniel Ewert, Lake Park, MN (US); Joel Jorgenson, Fargo, ND (US)

(73) Assignee: Anderson Industries, LLC, Webster, SD (US)

( * ) Notice: Subject to any disclaimer, the term of this patent is extended or adjusted under 35 U.S.C. 154(b) by 259 days.

(21) Appl. No.: 16/363,901

(22) Filed: Mar. 25, 2019

(65) Prior Publication Data

US 2019/0302772 A1 Oct. 3, 2019

Related U.S. Application Data

(60) Provisional application No. 62/649,345, filed on Mar. 28, 2018.

(51) Int. Cl.
*G05D 1/02* (2020.01)
*B60L 58/30* (2019.01)
*B60L 15/20* (2006.01)

(52) U.S. Cl.
CPC ............ *G05D 1/021* (2013.01); *B60L 15/20* (2013.01); *B60L 58/30* (2019.02); *G05D 2201/0201* (2013.01); *G05D 2201/0202* (2013.01)

(58) Field of Classification Search
CPC .......... G05D 1/021; G05D 2201/0202; G05D 2201/0201; G05D 2200/40; B60L 58/30;
(Continued)

(56) References Cited

U.S. PATENT DOCUMENTS 8,996,224 B1 3/2015 Herbach et al.
9,786,187 B1 * 10/2017 Bar-Zeev .............. G01C 21/00
(Continued)

FOREIGN PATENT DOCUMENTS

WO 2015134152 A1 11/2015

OTHER PUBLICATIONS

Narvesen, A. K., "Robust Control of Skid Steered Robotic Vehicles on High Friction," Engineering Masters Theses, Mechanical Engineering & Applied Mechanics Masters Theses, Apr. 2015, Fargo, ND.

(Continued)

*Primary Examiner* — Michael J Zanelli
(74) *Attorney, Agent, or Firm* — Womble Bond Dickinson (US) LLP

(57) ABSTRACT

An autonomous vehicle powered by a fuel cell is described. The vehicle includes one or more sensors and a control system operatively coupled to the fuel cell and the one or more sensors, the control system including a processing device to receive a command corresponding to one or more actions to be performed by the autonomous vehicle. In response to receiving the command, the processing device is to initiate performance of the one or more actions. The processing device is further to receive, from the sensors, signals associated with surroundings of the autonomous vehicle during performance of the one or more actions and adjust one or more operational parameters of the autonomous vehicle to enable completion of the performance of the one or more actions based on the signals associated with the surroundings of the autonomous vehicle.

22 Claims, 8 Drawing Sheets

(58) Field of Classification Search
CPC ...... B60L 15/20; B60L 2200/40; Y02E 60/50; Y02T 10/72; Y02T 90/40; H01M 2250/20
See application file for complete search history.

(56) References Cited

U.S. PATENT DOCUMENTS

| | | | | |
|---|---|---|---|---|
| 2004/0250908 | A1* | 12/2004 | Hicks | A01G 23/00 144/335 |
| 2009/0236182 | A1* | 9/2009 | Yamagami | B66F 9/24 187/222 |
| 2015/0185034 | A1 | 7/2015 | Abhyanker | |
| 2015/0274323 | A1* | 10/2015 | Loignon | B60L 1/006 180/53.5 |
| 2016/0020473 | A1* | 1/2016 | King | H01M 8/04947 307/10.1 |
| 2017/0214070 | A1* | 7/2017 | Wang | H01M 8/04865 |
| 2020/0146226 | A1* | 5/2020 | Hamilton | G06N 20/00 |

OTHER PUBLICATIONS

International Search Report and Written Opinion for International Application No. PCT/US2019/024066, dated Aug. 8, 2019.
Transmittal of International Preliminary Report on Patentability for International Application No. PCT/US2019/024066, dated Oct. 8, 2020, pp. 6.

* cited by examiner

FUEL CELL POWERED AUTONOMOUS VEHICLE

CROSS REFERENCE TO RELATED APPLICATIONS

This application claims the benefit of U.S. Provisional Patent Application No. 62/649,345, filed on Mar. 28, 2018, the disclosure of which is incorporated herein by reference in its entirety.

TECHNICAL FIELD

Aspects and implementations of the present disclosure relate to autonomous vehicles and, in particular, fuel cell powered autonomous vehicles.

BACKGROUND

An autonomous vehicle can guide itself without human conduction. The autonomous vehicle includes multiple sensors to acquire data associated with the surroundings of the vehicle. Based on the data acquired from the sensors, a control system of the vehicle identifies navigational paths for the vehicle to reach a desired destination.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1A:
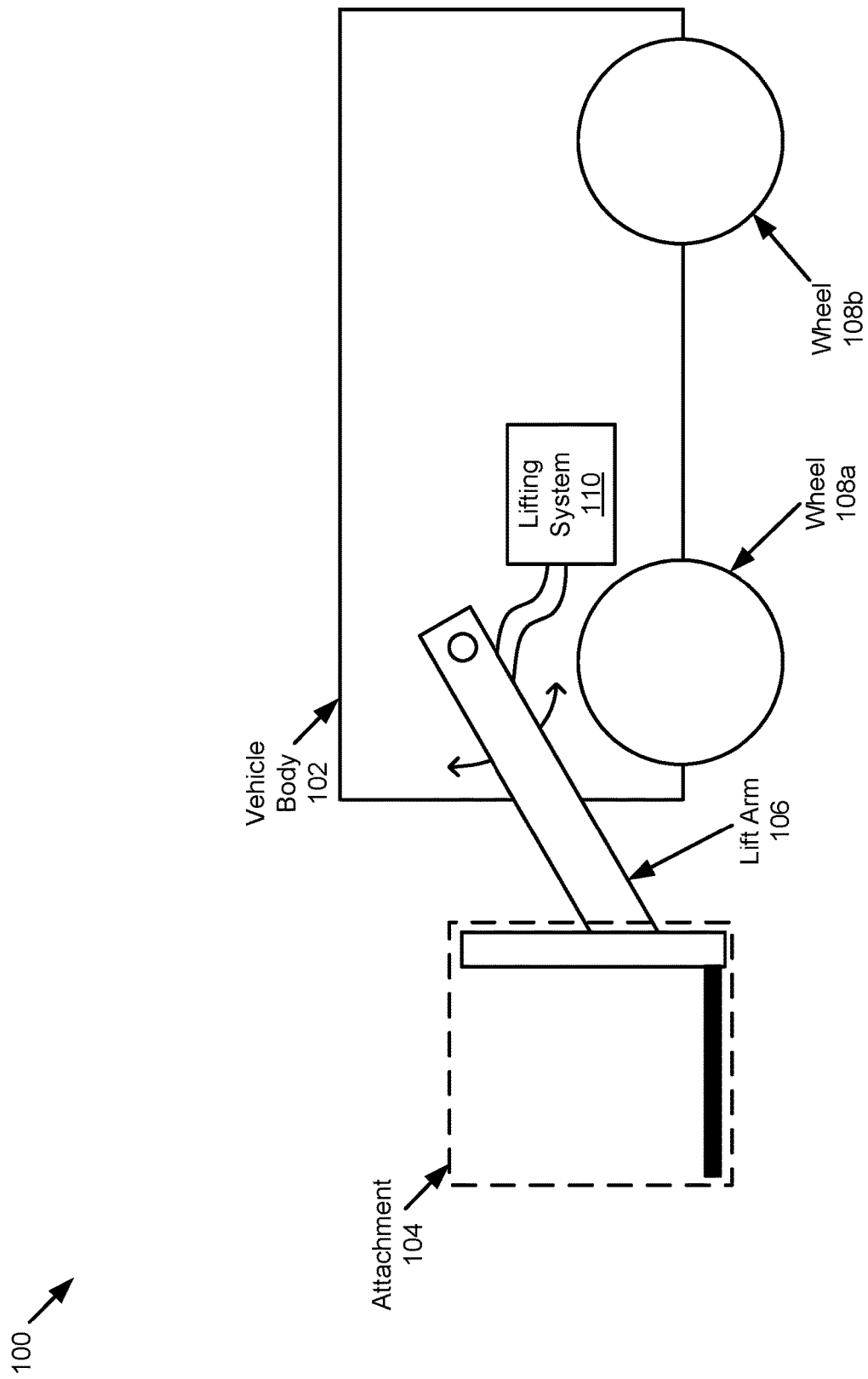
FIG. 1A is a cross section of an autonomous vehicle in accordance with embodiments of the disclosure.

Aspects and implementations of the present disclosure are directed to an autonomous vehicle powered by a fuel cell. In one embodiment, the autonomous vehicle (also referred to as "vehicle" hereafter) is a skid steer or tractor that performs labor-saving tasks, such as gathering and moving materials. The vehicle includes a plurality of sensors and a control system operatively coupled with the plurality of sensors. The vehicle further includes electric motors powered by a fuel cell stack to propel the vehicle.

One example of a conventional autonomous vehicle may utilize an internal combustion engine (ICE) using gasoline, diesel or other fuels. However, when using a conventional autonomous vehicle having an ICE, a human operator is still required to be present for multiple reasons. For example, in the event of a mechanical failure of the vehicle, a human operator is required to intervene to prevent damage to the vehicle and perform maintenance on any one of the many thousand failure points and moving parts of the ICE that may have failed. Furthermore, a human operator may be required to intervene in the event of a failure of the ICE to prevent the spillage of volatile fuels, which may cause environmental risk, a fire and/or an explosion.

Another example of a conventional autonomous vehicle may utilize one or more electric motors powered by batteries to propel the vehicle. However, the energy density of the batteries powering the electric motors is relatively low. The low energy density results in a large amount of batteries being required to power the one or more electric motors, increasing the cost, weight and size of the vehicle. Furthermore, the time required to recharge the batteries results in increased downtime for the conventional autonomous vehicle.

In embodiments, an autonomous vehicle may operate in hazardous environments. For example, the autonomous vehicle may be required to traverse through ice, mud, sand or other hazardous surfaces. Conventional autonomous vehicles utilizing ICEs or electric motors powered by batteries may have difficulties traversing such environments, as the weight of the conventional vehicles is relatively high due to the ICEs or batteries of the conventional autonomous vehicles, causing the vehicle to sink into these surfaces.

Embodiments described herein may create a new class of vehicles that perform repetitive actions safely and efficiently, without the requirement of the human operator. One aspect of embodiments described is the elimination of the internal combustion engine, since engines may represent a significant failure point. Embodiments have replaced the mechanical drive system of an ICE with an electric drive system, where an onboard electrical generation system is driven by a fuel cell stack. The vehicle allows for a plurality of attachments to be used interchangeably, from forks and buckets to move agricultural products to snow blowers and sweepers to clean roads, driveways, and parking lots. On-vehicle sensors detect the surroundings of the autonomous vehicle for safety, and the on-board electronics will perform a given action within a defined geographic boundary.

Embodiments of the present disclosure provide for an autonomous vehicle powered by a fuel cell for agricultural, residential, and industrial purposes. Compared to ICEs or batteries, fuel cells have a high energy density. Accordingly, a vehicle utilizing fuel cells for power can be smaller and lighter than a vehicle utilizing ICEs or batteries. This enables fuel cell powered vehicles to traverse terrain that a conventional vehicle powered by an ICE or batteries may not be able to traverse, improving the performance of the autonomous vehicle.

A fuel cell stack uses chemical processes to convert a hydrocarbon fuel (in either gaseous or liquid form) directly to electricity with minimal or no moving parts. The elimination of moving parts simplifies the maintenance of a fuel cell stack compared to the maintenance of an ICE, since there is no oil changes required, no filter changes required, and no coolants to monitor and maintain. Additionally, there is little noise from an operating fuel cell stack, and the only byproducts of the conversion are heat and water vapor.

The output of the fuel cell stack is electricity, which is used to drive the electric motors that are connected to the vehicle drive system and to power the on-vehicle electronics. The use of electric motors for the vehicle drive system produces an efficient, high-torque, high-speed design. Each wheel may be independently driven by its own electric motor, allowing skid steer operation directly controlled by the control system.

In one embodiment, the fuel cell stack is powered by hydrogen that is produced by a fuel reformer. The fuel reformer converts a conventional fuel source, such as diesel, gasoline, methanol, ethanol, aviation fuel, jet fuel, kerosene or similar hydrocarbons into pure hydrogen. An advantage of using a fuel cell reformer is to eliminate the transportation of hydrogen tanks, which have an extremely low energy density. One embodiment uses a fuel mixture of deionized water and methanol, which is miscible and biodegradable. Therefore, there is little chance for any contamination of groundwater or soil due to fluid leaks.

The control system monitors the fuel level of the fuel used by the fuel reformer, the electrical output of the fuel cell stack, interfaces with a plurality of sensors, switches, and inputs, and connects to a wireless communication system for remote monitoring and management of the autonomous vehicle. The remote monitoring and management may be reporting of the actions completed by the autonomous vehicle, status of vehicle performance and system health, and is a conduit of communications for a human to remotely enter instructions.

Using either a pre-programmed set of commands or a set of commands remotely entered, the autonomous vehicle may perform actions such as moving objects, removing snow or debris, or sweeping sidewalks. On-vehicle sensors detect the geographic boundaries of a perimeter, detect motion and speed, and detect obstructions to prevent collisions. A camera system captures vehicle operation for instant review or for data storage.

FIG. 1A is a cross section of an autonomous vehicle 100 in accordance with embodiments of the disclosure. In embodiments, vehicle 100 may be a skid steer or a tractor. In some embodiments, vehicle 100 may be another type of vehicle, such as an automobile, a sport utility vehicle (SUV), a truck, a boat, a drone, an all-terrain vehicle (ATV), or the like. Vehicle 100 includes a vehicle body 102 that may include a chassis and/or frame to enclose and protect one or more components of vehicle 100.

In embodiments, vehicle 100 includes a lift arm 106 operatively coupled to a lifting system 110. The lifting system 110 may be a linear actuator, hydraulics system or other system capable of generating a force to lift the lift arm 106 to enable performance of actions by vehicle 100.

Various attachments 104 may be coupled to lift arm 106 to facilitate the performance of one or more actions by vehicle 100. Examples of attachments 104 that may be coupled to lift arm 106 include, but are not limited to, forks, clamps, spears, buckets, snow blowers, brooms, brush cutters, concrete breakers, backhoes, cement mixers, dozer blades, graders, mulchers, rakes, spreaders, tillers, plows, saws, trenchers, vacuum lifters or vibratory rollers. Based on the action(s) to be performed by vehicle 100, a particular attachment 104 may be coupled to lift arm 106 to facilitate performance of the action(s). For example, if the action to be performed by vehicle 100 is moving hay bales, a bale spear may be coupled to lift arm 106.

In embodiments, vehicle 100 may include wheels 108a and 108b that are operatively coupled to one or more electric motors to propel the vehicle 100. Although illustrated as having wheels 108a and 108b, in some embodiments, vehicle 100 may include tracks (e.g., tank treads) instead of wheels 108a and 108b.

Figure 1B:
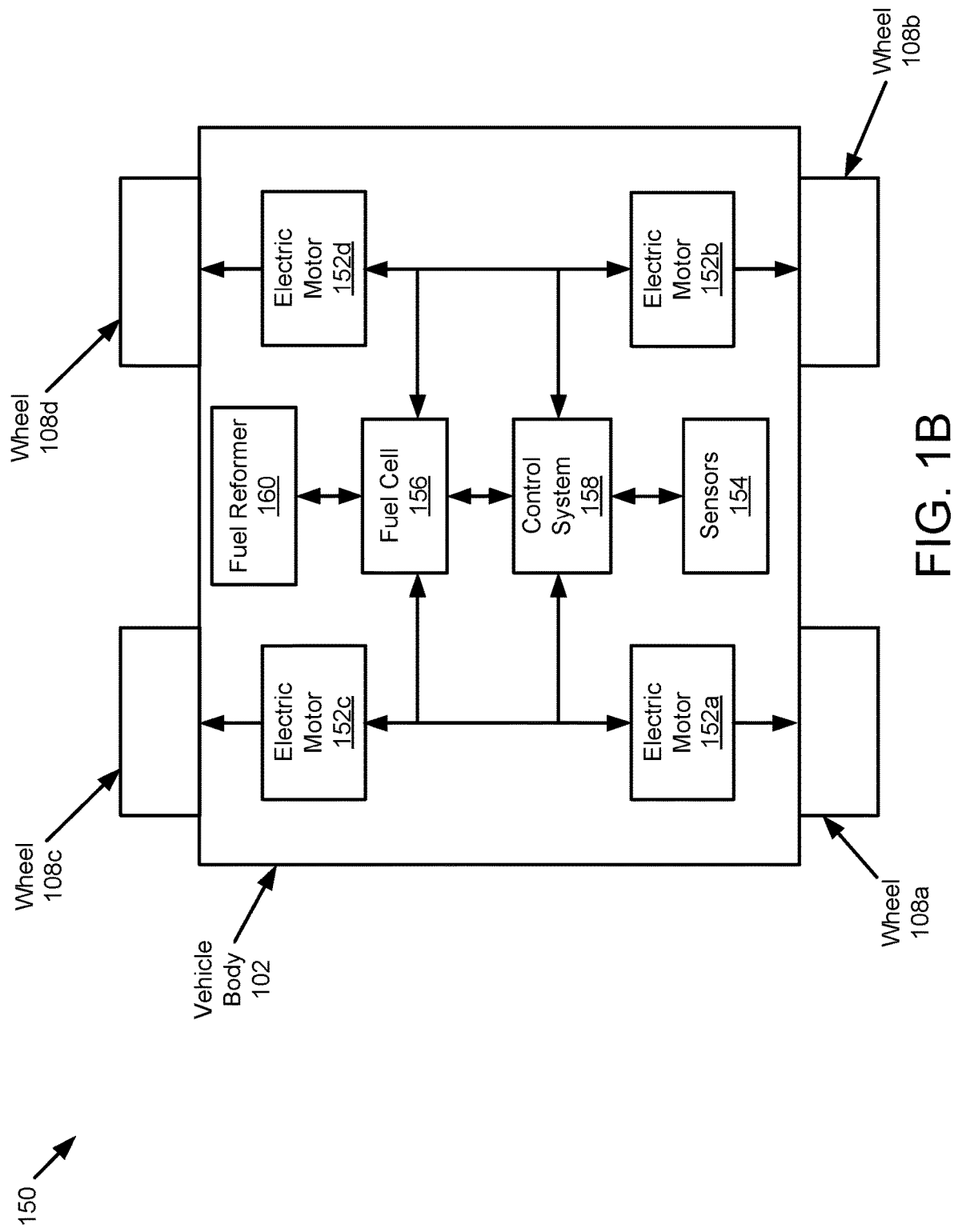
FIG. 1B is a top-down view of an autonomous vehicle in accordance with embodiments of the disclosure.

FIG. 1B is a top-down view of an autonomous vehicle 150 in accordance with embodiments of the disclosure. Vehicle 150 may correspond to vehicle 100 as previously described at FIG. 1A. Vehicle 150 may include electric motors 152a-d, one or more sensors 154, a fuel cell 156 power source, a fuel reformer 160 and a control system 158.

Electric motors 152a-d may be coupled to wheels 108a-d, respectively, to propel vehicle 150. Although illustrated as having one electric motor driving each wheel of vehicle 150, in embodiments vehicle 150 may have more or less electric motors. For example, vehicle 150 may have a first electric motor driving wheels 108a and 108b and a second electric motor driving wheels 108c and 108d. Electric motors 152a-d may be operatively coupled to fuel cell 156 to receive electricity generated by the fuel cell 156. Electric motors 152a-d may also be coupled to control system 158 to send and/or receive data from control system 158. In embodiments, vehicle 150 may include one or more motor controllers (not shown) operatively to the electric motors 152a-d to receive electric power from the fuel cell 156 and convert the electric power into an adjustable frequency to enable speed control of the electric motors 152a-d.

As previously described, fuel cell 156 converts energy from the fuel through an electrochemical reaction of the fuel with oxygen or another oxidizing agent. The fuel cell can include an anode, an electrolyte and a cathode. At the anode a catalyst oxidizes the fuel, turning the fuel into positively charged ions and negatively charged electrons. The positively charged ions pass through the electrolyte, while the negatively charged electrons cannot pass through the electrolyte. The negatively charged electrons travel through a wire to create electric current. The negatively charged electrons are then reunited with the positively charged ions at the cathode, where the negatively charged electrons react with the positively charges ions to produce water vapor and heat. Various types of fuel cells may be used in various embodiments of the present disclosure depending on a type of fuel of the fuel source. Examples of types of fuel cells that may be used include, but are not limited to, proton exchange membrane fuel cells (PEMFCs), phosphoric acid fuel cells (PAFCs), solid acid fuel cells (SAFCs), alkaline fuel cells (AFC), solid oxide fuel cells (SOFCs), molten carbonate fuel cells (MCFCs) and electric storage fuel cells.

In embodiments, the water vapor byproduct of the electrochemical reaction within the fuel cell 156 may be utilized by auxiliary systems (not shown) or an attachment (e.g., attachment 104 of FIG. 1A) of vehicle 150. For example, if the auxiliary system or attachment is a cement mixer, the water vapor byproduct of the fuel cell 156 may be added to the cement mixer to be combined with the cement, providing an additional advantage over conventional vehicles powered by ICEs or batteries.

Vehicle 150 may include a fuel reformer 160 that is operatively coupled to fuel cell 156. The fuel reformer 160 converts a conventional fuel source, such as diesel, gasoline, methanol, ethanol, aviation fuel, jet fuel, kerosene or similar hydrocarbons into pure hydrogen. The hydrogen may then be provided to fuel cell 156.

Vehicle 150 may include one or more sensors 154 operatively coupled to control system 158. The one or more sensors 154 may acquire information associated with the surroundings of vehicle 150 and generate signals based on the information. The generated signals are then provided to the control system 158 for analysis. In embodiments, the one or more sensors 154 may include one or more ultrasonic sensors that measure the distance from vehicle 150 to objects by transmitting and receiving ultrasonic signals. In some embodiments, the one or more sensors 154 may include an inertial mass unit (IMU) that includes accelerometers, gyroscopes and/or magnetometers to measure the vehicle's 150 specific force, angular rate and/or magnetic field. In an embodiment, the one or more sensors 154 may include one or more cameras for recording visual images of the surroundings of vehicle 150.

In embodiments, the one or more sensors 154 may include a global positioning system (GPS) sensor that utilizes a satellite-based navigation system to acquire geographic position, velocity and timing information associated with vehicle 150. In some embodiments, the one or more sensors 154 may include one or more light detection and ranging (LIDAR) apparatuses that use laser pulses to measure the distance from vehicle 150 to objects. In an embodiment, the one or more sensors 154 may include one or more radio-frequency (RF) sensors to receive RF signals, such as from a radio-frequency identification (RFID). In embodiments, the one or more sensors 154 may include any type of sensor capable of acquiring information associated with the vehicle 150.

The control system 158 includes a processing device configured to receive and monitor signals received from the fuel cell 156, the one or more sensors 154 and/or electric motors 152a-d. The control system 158 may receive commands via a user interface corresponding to one or more actions to be performed by vehicle 150. The control system 158 may provide commands to the fuel cell 156 to adjust the power output of the fuel cell 156. The control system 158 may provide commands to electric motors 152a-d or a motor controller of electric motors 152a-d to adjust the speed of one or more of electric motors 152a-d. Additional details with regards to operations performed by control system 158 will be described below.

Figure 2:
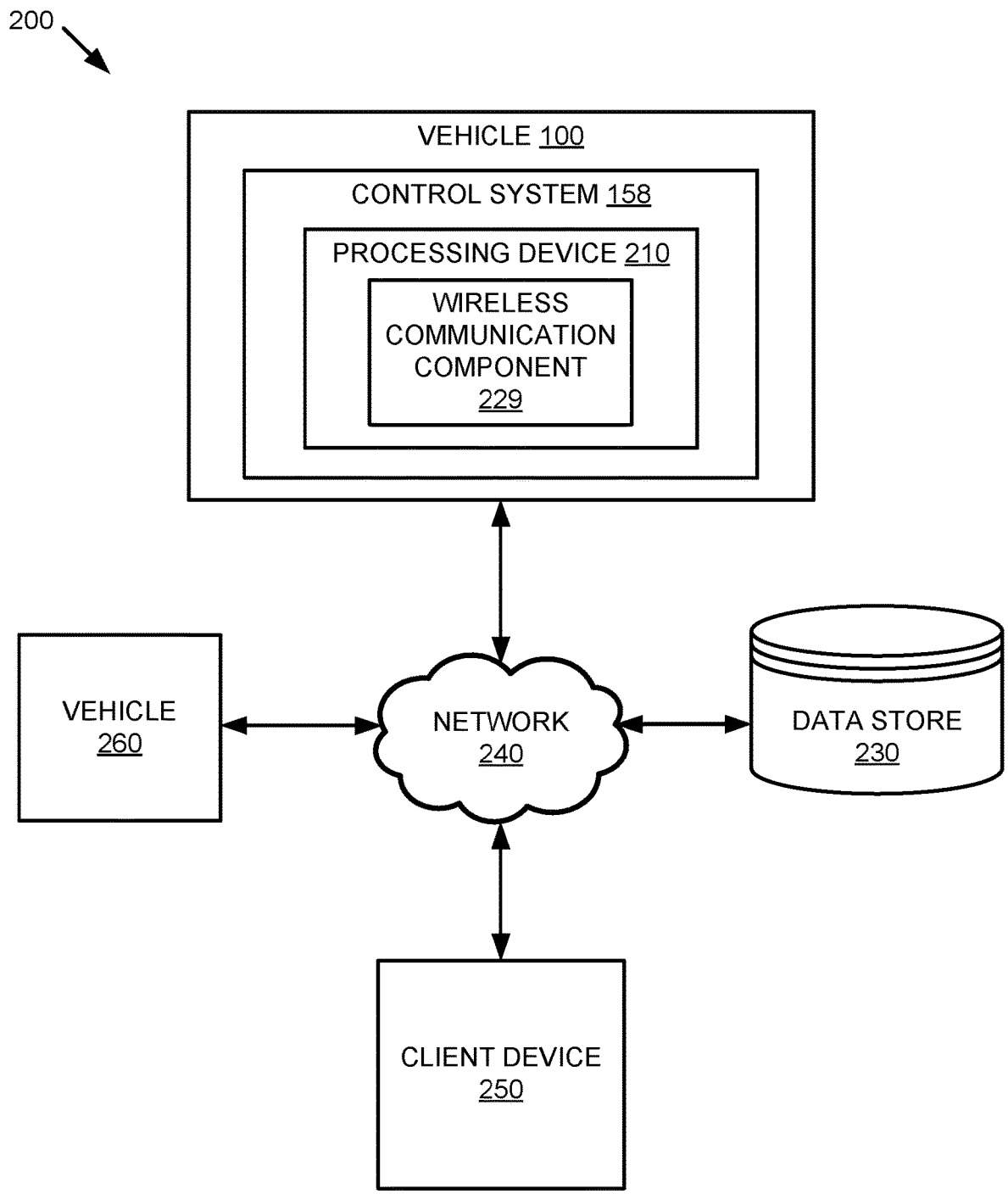
FIG. 2 is a block diagram that illustrates an example of a wireless communication system in accordance with an embodiment of the present disclosure.

FIG. 2 is a block diagram that illustrates an example of a wireless communication system 200, in accordance with an embodiment of the present disclosure. The wireless communication system 200 may include control system 158 of a vehicle 100, as previously described with respect to FIGS. 1A and 1B. The control system 158 includes a processing device 210 that executes a wireless communication component 229. In embodiments, the control system 158 may be operatively coupled to a data store 230, other vehicle(s) 260 and a client device 250 via a network 240. In some embodiments, the data store 230 may reside in the control system 158.

The network 240 may be a public network (e.g., the internet), a private network (e.g., a local area network (LAN) or wide area network (WAN)), or a combination thereof. In one embodiment, network 240 may include a wired or a wireless infrastructure, which may be provided by one or more wireless communications systems, such as a WiFi™ hotspot connected with the network 240 and/or a wireless carrier system that can be implemented using various data processing equipment, communication towers (e.g. cell towers), etc.

The client device 250 may be a computing device, such as a personal computer, laptop, cellular phone, personal digital assistant (PDA), gaming console, tablet, etc. In embodiments, the client device 250 may be associated with a human operator of the autonomous vehicle 100.

Vehicle 260 may be one or more other vehicles that are communicatively coupled to the wireless communication system 200. Vehicle 260 may transmit information associated with the surroundings or actions to be performed by vehicle 100 to the data store 230, client device 250 and/or control system 158. For example, vehicle 260 may be a hay baler that bales hay. Upon baling the hay, vehicle 260 may transmit an approximate geographic location of the hay bale to the data store 230, client device 250 and/or control system 158, as will be described in further detail below.

The data store 230 may be a persistent storage that is capable of storing data (e.g., actions, performance data, location, topography, etc. associated with vehicle 100, as described herein). A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. In embodiments, data store 230 may be a central server or a cloud-based storage system including a processing device (not shown). The central server or the cloud-based storage system may be accessed by control system 158, client device 250 and/or vehicle 260.

In embodiments, wireless communication component 229 may transmit data to client device data store 230, client device 250 and/or vehicle 260. Wireless communication component 229 may receive, from client device 250, commands corresponding to one or more actions to be performed by vehicle 100.

Figure 3:
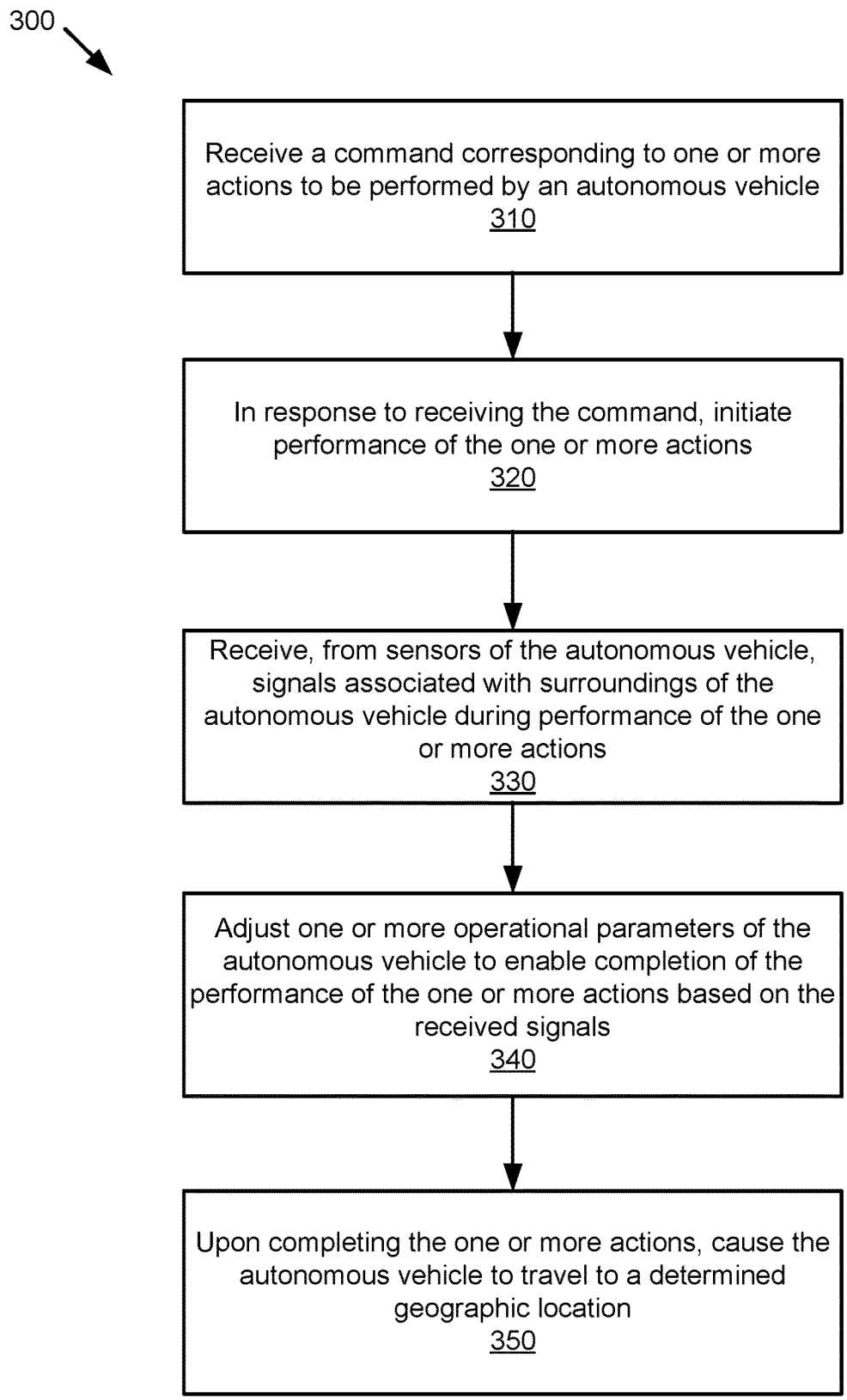
FIG. 3 depicts a flow diagram of a method for controlling an autonomous vehicle powered by a fuel cell in accordance with one implementation of the present disclosure.

FIG. 3 depicts a flow diagram of a method 300 for controlling an autonomous vehicle powered by a fuel cell in accordance with one implementation of the present disclosure. In embodiments, various portions of method 300 may be performed by processing logic of a processing device of control system 158 of FIG. 1B.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

At block 310, the processing logic receives a command corresponding to one or more actions to be performed by an autonomous vehicle powered by a fuel cell. In embodiments, the command may be received from a client device via a wireless communication system, as previously described. In some embodiments, the command may be received via a local console located on the autonomous vehicle. The command may indicate which particular actions are to be performed by the autonomous vehicle. For example, the command may indicate that the autonomous vehicle is to gather hay bales, shovel snow, mow a field, etc. The command may further include information associated with the actions to be performed by the autonomous vehicle. For example, the command may indicate the types of objects, such as hay bales, the actions are to be performed on to enable the processing logic to identify the objects. In another example, the command may include geographic information, such as geographic boundaries the vehicle is to remain within while performing the actions and geographic locations corresponding to areas where the actions are to be performed. In some embodiments, the command may include a determined location (e.g., a home location) that the autonomous vehicle is to return to upon completion of the actions.

In response to receiving the command, at block 320 the processing logic may initiate the performance of the one or more actions by the autonomous vehicle. The processing logic may initiate performance by providing commands to the fuel cell and/or electric motors of the vehicle to increase/decrease power output. In embodiments, the wheels of the vehicle may be locked, either mechanically or electronically, in synchronization with one another on each side of the vehicle. The processing logic may turn the vehicle by using differential steering, where the left and right wheel pairs are operated at different speeds to turn the vehicle in a desired direction. In other embodiments, the vehicle may include a steering mechanism that rotates the wheels of the vehicle. The processing logic may turn the vehicle by transmitting signals to the steering mechanism that causes the wheels to rotate and turn the vehicle.

In embodiments, the processing logic may provide commands to the lifting system and/or attachment to perform the actions. For example, the processing logic may transmit signals to the lifting system to cause the lifting system to raise/lower the lift arm of the vehicle for performance of the actions. In another example, the processing logic may transmit signals to the attachment of the vehicle to cause the attachment to perform actions, such as the opening/closing of a clamp attachment.

At block 330, the processing logic receives signals from the one or more sensors of the vehicle that are associated with the surroundings of the vehicle during performance of the actions. In some embodiments, the signals may correspond to a geographic location received from a GPS sensor of the vehicle during the performance of the actions. In embodiments, the signals may correspond to optical or acoustic signals received from ultrasonic sensors, LIDAR apparatuses and/or cameras of the vehicle. In an embodiment, the received signals may correspond to a specific force experienced by the vehicle received from an IMU of the vehicle.

At block 340, the processing logic adjusts one or more operational parameters of the vehicle to enable completion of the performance of the one or more actions based on the received signals at block 330. Examples of operational parameters of the vehicle may include, but are not limited to, electric motor speed/power, fuel cell output power, vehicle trajectory, vehicle speed or lift arm/attachment positioning.

In one example scenario of gathering hay bales, a received image from a camera showing that the autonomous vehicle is approaching a hay bale to be gathered. The processing logic may identify the hay bale in the image and adjust the trajectory and speed of the vehicle so that the vehicle approaches the hay bale. The processing logic may also adjust the position of the lift arm and bale spear to enable the autonomous vehicle to gather the hay bale.

In another example scenario of shoveling snow, the processing logic may determine that the vehicle has arrived at a geographic location of a designated area that is to be shoveled based on a received signal from the GPS sensor. The processing logic may adjust the trajectory and speed of the vehicle as well as lower a lift arm including a shovel to enable the vehicle to shovel snow from the area.

Upon completing the one or more actions, at block 350 the processing logic may cause the autonomous vehicle to travel to a determined geographic location. Once the autonomous vehicle has completed the actions, the processing logic may cause the autonomous vehicle to travel to the determined geographic location by adjusting the operational parameters of the vehicle, as previously described at block 340. In embodiments, the determined geographic location may correspond to a home location for the autonomous vehicle. For example, the determined geographic location may correspond to a garage or refueling station for the autonomous vehicle.

Figure 4:
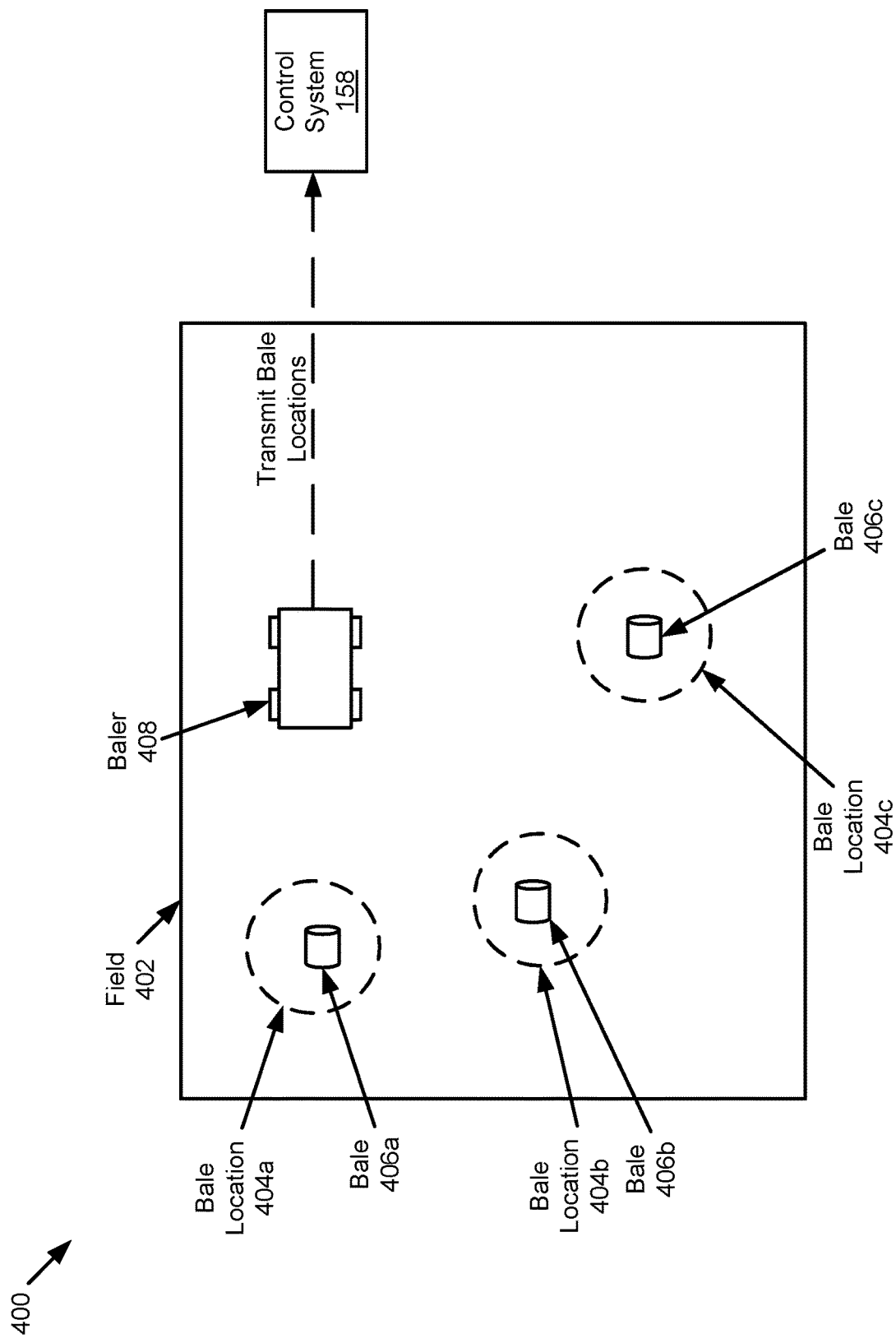
FIG. 4 is an illustration of an example of a secondary vehicle transmitting information associated with an action to a control system of an autonomous vehicle in accordance with embodiments of the disclosure.

FIG. 4 is an illustration 400 of an example of a secondary vehicle transmitting information associated with an action to a control system of an autonomous vehicle in accordance with embodiments of the disclosure. In illustration 400, the action to be performed by the autonomous vehicle is the above described scenario of gather bales of hay. In some embodiments, prior to the autonomous vehicle gathering bales of hay, a secondary vehicle, such as baler 408, may transmit information associated with the actions to the control system 158 of the autonomous vehicle (not shown). For example, when baler 408 compresses hay into a hay bale, baler 408 may transmit information associated with the hay bales to the control system 158 of the autonomous vehicle.

Referring to FIG. 4, baler 408 has gathered and compressed hay from field 402 into bales 406a-c. The bales 406a-c are left in various locations of field 402. In some embodiments, upon compressing the hay into bales 406a-c, the baler 408 may couple a RFID transmitter to bales 406a-c to assist the autonomous vehicle in locating and identifying the bales 406a-c. In embodiments, the baler 408 may transmit identification information associated with the RFID transmitters to control system 158. During or after the formation of bales 406a-c, baler 408 may transmit bale locations 404a-c to control system 158. The bale locations 404a-c may correspond to the approximate geographic location of bales 406a-c, respectively. For example, bale locations 404a-c may correspond to GPS coordinates where bales 406a-c were left in field 402 by baler 408.

In some embodiments, the information, such as bale locations 404a-c, associated with the actions may be transmitted to a data store and/or a client device (e.g., data store 230 and client device 250 of FIG. 2) in addition to or instead of transmitting the information to control system 158. For example, bale locations 404a-c may be transmitted to a client device for display in a user interface.

Figure 5:
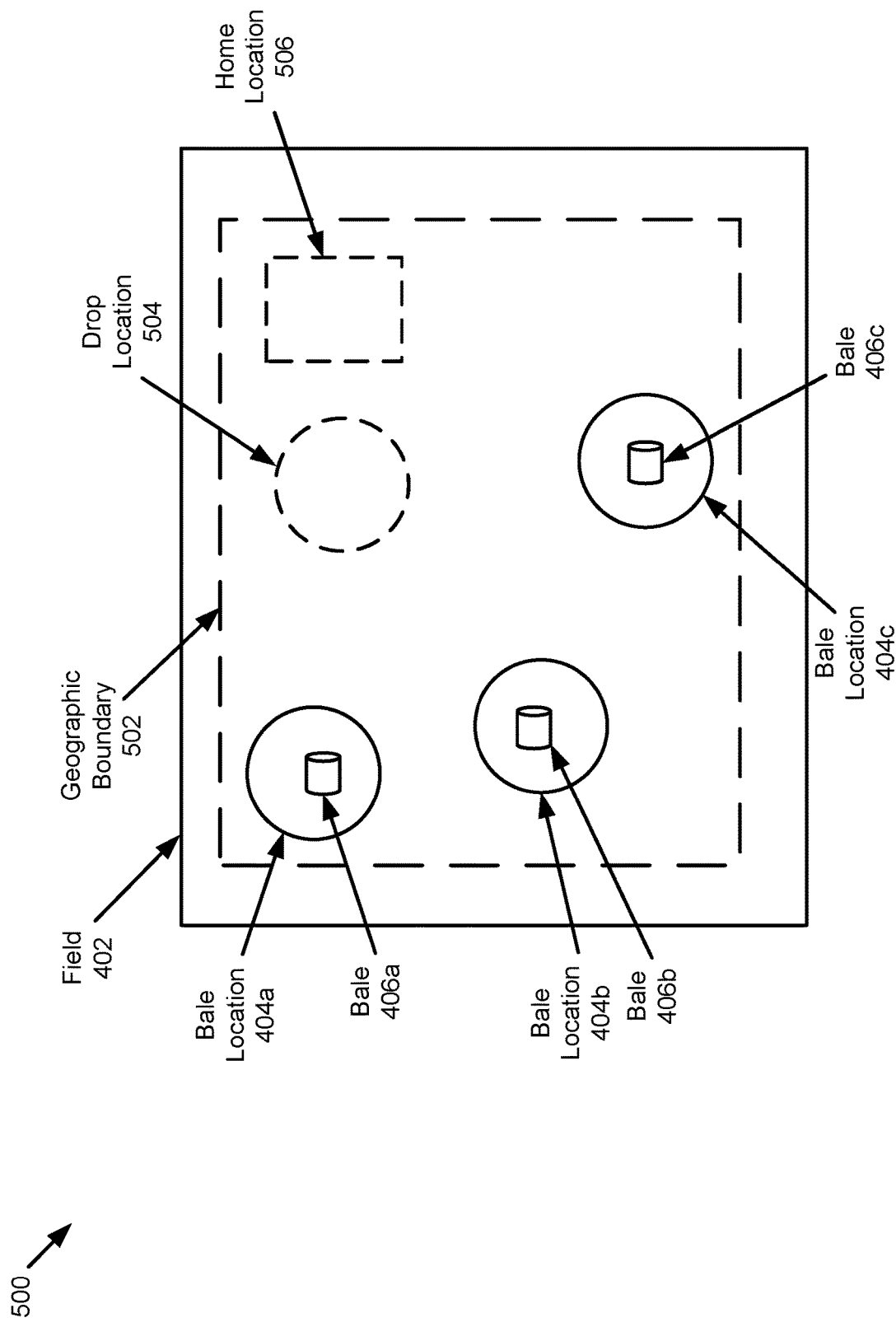
FIG. 5 is an illustration of an example of a user interface to receive inputs associated with actions to be performed by an autonomous vehicle in accordance with embodiments of the disclosure.

FIG. 5 is an illustration of an example of a user interface 500 to receive inputs associated with actions to be performed by an autonomous vehicle in accordance with embodiments of the disclosure. In embodiments, user interface 500 may be displayed by a client device, such as client device 250 of FIG. 2. In some embodiments, user interface may be displayed by a local console of an autonomous vehicle.

The user interface 500 may include an image or illustrative representation of field 402, bale locations 404a-c and/or bales 406a-c as previously described at FIG. 4. A human operator may provide inputs to the client device/local console via the user interface 500. For example, the operator may provide inputs via the user interface 500 using a touch screen, mouse, keyboard or other input/output (TO) device. In some embodiments, processing logic of the client device/local console may provide the inputs via the user interface 500 without human operator interaction. For example, the client device may implement one or more algorithms and/or machine learning models to provide inputs via the user interface 500.

Referring to FIG. 5, inputs corresponding to a geographic boundary 502, a drop location 504 and a home location 506 have been provided via the user interface 500. The geographic boundary 502 may correspond to a determined geographic area that the autonomous vehicle is to remain within during the performance of the actions (e.g., gathering hay bales 406a-c). For example, geographic boundary 502 may be one or more ranges of GPS coordinates that the vehicle is to remain within. The drop location 504 may correspond to an area of field 402 that the autonomous vehicle is to place the gathered hay bales 406a-c. For example, the drop location 504 may correspond to GPS coordinates for a geometric area the gathered hay bales 406a-c are to be placed. The home location 506 may correspond to a determined location that the autonomous vehicle is to travel to upon completion of the actions (e.g., gathering of bales 406a-c at drop location 504).

In embodiments, the inputs provided via the user interface 500 may indicate particular objects actions are to be performed on. For example, the client device may select bales 406a-b to be gathered via the user interface 500, but indicate that bale 406c is not to be gathered by not selecting bale 406 in user interface 500. In some embodiments, the inputs provided via the user interface 500 may indicate one or more desired travel paths for the autonomous vehicle during the performance of the task. For example, the client device may provide a particular route for the autonomous vehicle to use when traveling to gather bale 406b.

Upon receiving the inputs via the user interface 500, the client device/local console may generate a command based on the inputs received via the user interface 500. For example, the client device/local console may generate a command for the autonomous vehicle to gather bales 406a-c including the geographic boundary 502, drop location 504 and home location 506. The client device/local console may then transmit the generated command to the control system of the autonomous vehicle.

Figure 6:
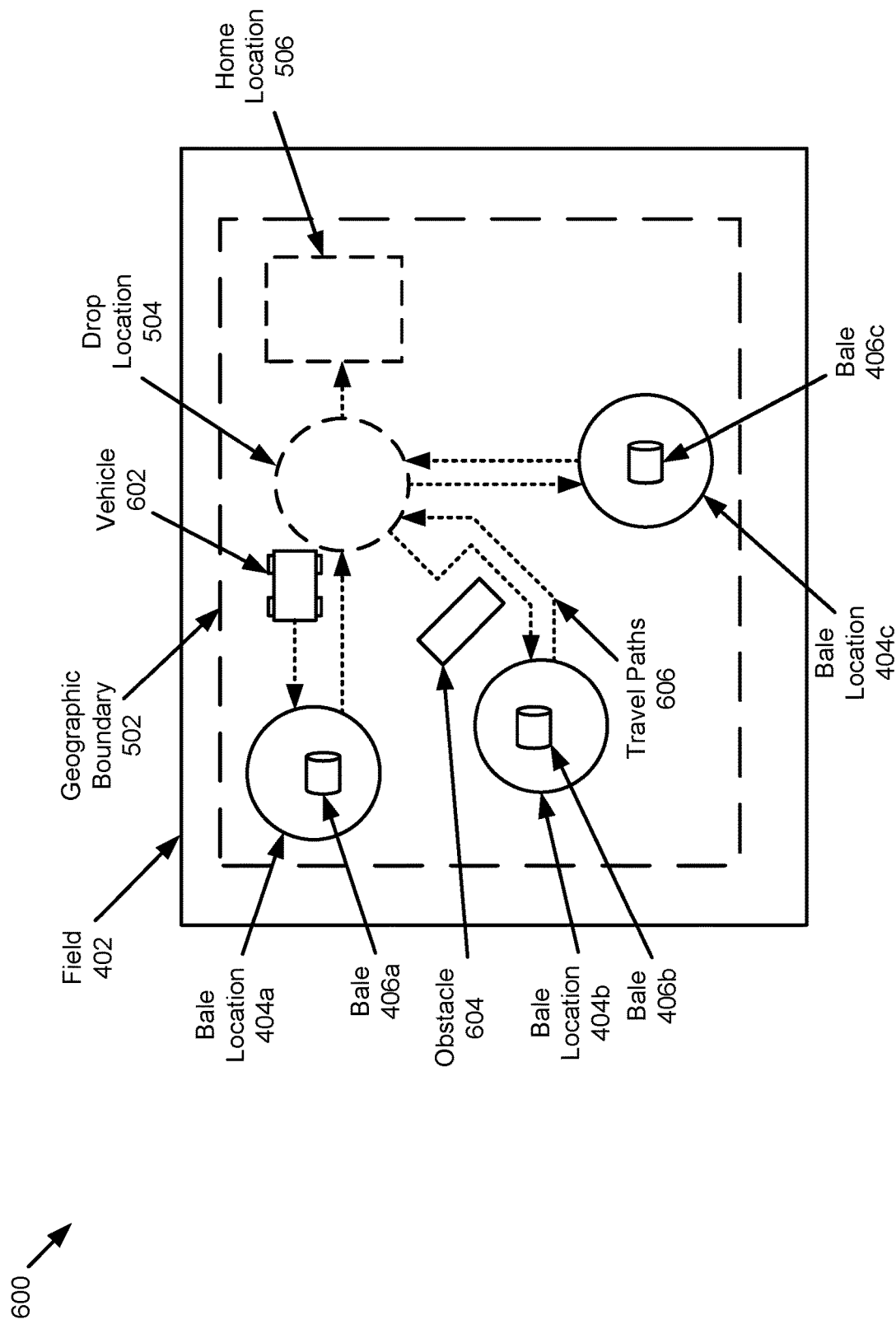
FIG. 6 is an illustration of an example of an autonomous vehicle performing actions associated with a received command in accordance with embodiments of the disclosure.

FIG. 6 is an illustration 600 of an example of an autonomous vehicle performing actions associated with a received command in accordance with embodiments of the disclosure. Upon receiving a command, the control system of vehicle 602 may initiate performance of the actions associated with the received command.

Referring to FIG. 6, the control system of vehicle 602 has received a command to gather bales 406a-c located in field 402. In some embodiments, the control system of vehicle 602 has received bale locations 404a-c corresponding to approximate geographic locations of bales 406a-c, respectively, as previously described in FIG. 4. In embodiments, the bale locations 404a-c may be included with the command to gather bales 406a-c. In an embodiment, the control system of the vehicle 602 may determine bale locations 404a-c based on RFID signals transmitted by RFID transmitters coupled to bales 406a-c, as previously described.

Upon receiving the command, the control system of vehicle 602 may determine one or more travel paths 606 that the vehicle 602 is to travel along during the performance of the actions (e.g., gathering bales 406a-c). As the vehicle 602 travels along travel paths 606, the control system of the vehicle 602 may receive signals from one or more sensors of vehicle 602. The control system may analyze the signals to identify features/objects in the surroundings of vehicle 602. Based on the analysis of the signals, the control system of vehicle 602 may make adjustments to operational parameters of vehicle 602 to enable vehicle 602 to perform the actions associated with the command. For example, based on received GPS signals from a GPS sensor, the control system may adjust the motor speed/steering of vehicle 602 such that vehicle 602 travels along one of the travel paths 606.

In an example scenario, as vehicle 602 travels along travel paths 606, the control system of vehicle 602 may identify an obstacle 604 in an originally determined travel path for the vehicle 602 to travel along while performing the actions. For example, while traveling along the originally determined travel path towards bale location 404b, the control system of vehicle 602 may identify an obstacle 604, such as a fallen tree branch, in the originally determined travel path. Accordingly, the control system of vehicle 602 may determine new travel paths 606 to avoid obstacle 604. Upon determining the new travel paths 606, the control system may adjust one or more operational parameters of the vehicle 602 such that the vehicle 602 travels along the new travel paths 606 to and from bale location 404b that avoid obstacle 604.

Upon arriving at one of bale locations 404a-c, the control system of vehicle 602 may utilize received signals from the sensors to identify the bale (e.g., one of bales 406a-c) for collection by vehicle 602. In embodiments, the control system may utilize measurements received from one or more sensors, such as a LIDAR apparatus or ultrasonic sensor, to identify the position of the bale at the bale location. In some embodiments, the control system may utilize object recognition to identify the bales at the bale locations. For example, the control system may receive an image from a camera of vehicle 602 and utilize an object recognition algorithm to identify the bale within the received image. Upon identifying the bale, the control system may adjust one or more operational parameters of the vehicle 602 such that vehicle 602 performs the action of securing the bale. For example, the control system may adjust the motor speed of the vehicle 602 to position the vehicle 602 to secure the bale. The control system may also adjust the lift arm and/or attachment position to cause vehicle 602 to secure the bale.

Upon securing of the bale, the control system may cause vehicle 602 to travel along a return path to drop location 504. When the vehicle 602 arrives at the drop location 504, the control system may adjust one or more operational parameters of vehicle 602 to cause the vehicle to drop the bale in the drop location 504. For example, the control system may change the lift arm and/or attachment position to cause vehicle 602 to drop the bale at drop location 504. Upon completion of the actions, the control system may adjust one or more operational parameters of the vehicle 602 to cause the vehicle 602 to return to the home location 506.

Although described using the example scenario of gathering hay bales, aspects of the disclosure may be applied to any number of different types of actions to be performed for agricultural, residential, and industrial purposes.

Figure 7:
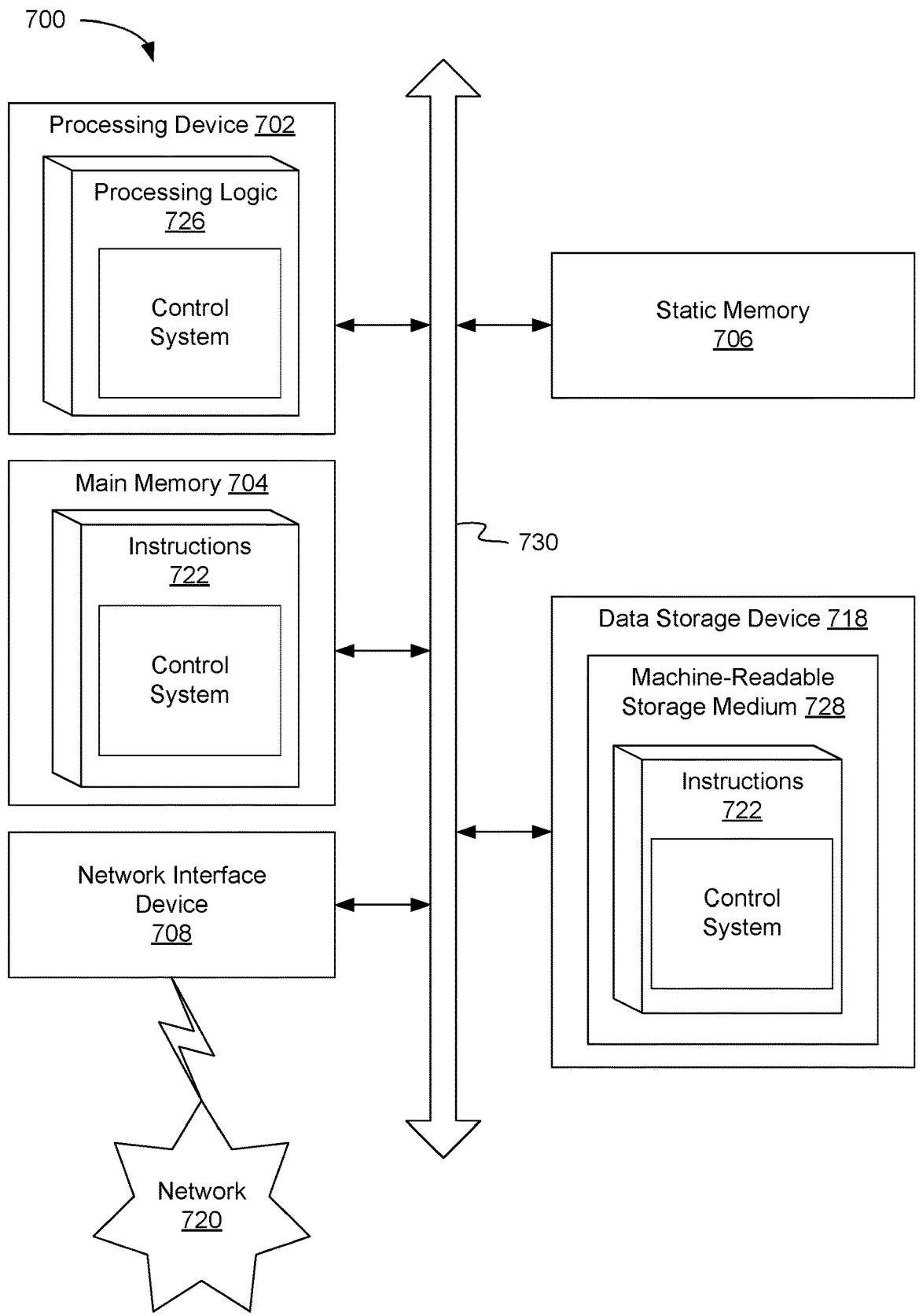
FIG. 7 is a block diagram illustrating an example computer system, in accordance with one embodiment of the present disclosure.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a web appliance, a server, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server configured to control the operations of vehicle 100.

The exemplary computer system 700 includes a processing device 702, a user interface display 713, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of control system 158 shown in FIG. 1B, for performing the operations and blocks discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute controls for an autonomous vehicle. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for device identification, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. An autonomous vehicle powered by a fuel cell, comprising:
   a plurality of sensors;
   an auxiliary system that utilizes a water vapor byproduct of the fuel cell; and
   a control system operatively coupled to the fuel cell and the plurality of sensors, the control system comprising a processing device to:
      receive a command corresponding to one or more actions to be performed by the autonomous vehicle;
      in response to receiving the command, initiate performance of the one or more actions;
      receive, from the plurality of sensors, signals associated with surroundings of the autonomous vehicle during performance of the one or more actions; and
      adjust one or more operational parameters associated with the fuel cell of the autonomous vehicle to enable completion of the performance of the one or more actions based on the signals associated with the surroundings of the autonomous vehicle.

2. The autonomous vehicle of claim 1, further comprising one or more electric motors operatively coupled to the fuel cell, wherein to adjust the one or more operational parameters associated with the fuel cell of the autonomous vehicle, the processing device is further to:
   adjust an output power of at least one of the fuel cell or a speed of at least one of the one or more electric motors.

3. The autonomous vehicle of claim 1, wherein the autonomous vehicle comprises one of a skid steer or a tractor.

4. The autonomous vehicle of claim 1, further comprising:
   a fuel reformer operatively coupled to the fuel cell, the fuel reformer to provide hydrogen fuel to the fuel cell.

5. The autonomous vehicle of claim 1, further comprising a wireless receiver, wherein to receive the command to perform the one or more actions to be performed by the autonomous vehicle, the processing device is further to:
   receive, via the wireless receiver from a client device, the command to perform the one or more actions to be performed by the autonomous vehicle.

6. The autonomous vehicle of claim 1, wherein the command to perform the one or more actions comprises an identification of a type of the one or more actions to be performed, a geographic location associated with the one or more actions to be performed, and geographic boundaries for the autonomous vehicle.

7. The autonomous vehicle of claim 1, wherein the plurality of sensors comprise at least one of a global positioning system (GPS) sensor, an ultrasonic sensor, a light detection and ranging (LIDAR) sensor, an optical sensor or an inertial measurement unit (IMU).

8. The autonomous vehicle of claim 1, wherein the processing device is further to:
   receive, from a second vehicle, data associated with the one or more actions to be performed by the vehicle.

9. A method of controlling an autonomous vehicle powered by a fuel cell, comprising:
   receiving a command corresponding to one or more actions to be performed by the autonomous vehicle;
   in response to receiving the command, initiating performance of the one or more actions;
   providing water vapor byproduct of the fuel cell to an auxiliary system during performance of the one or more actions;
   receiving, from a plurality of sensors by a processing device of a control system of the autonomous vehicle, signals associated with surroundings of the autonomous vehicle during performance of the one or more actions; and
   adjusting one or more operational parameters associated with the fuel cell of the autonomous vehicle to enable completion of the performance of the one or more actions based on the signals associated with the surroundings of the autonomous vehicle.

10. The method of claim 9, wherein the one or more actions comprises an action to be performed on an object, the method further comprising:
    identifying the object the action is to be performed on based on the received signals from the plurality of sensors of the autonomous vehicle, wherein the adjusting of the one or more operational parameters associated with the fuel cell of the autonomous vehicle enables completion of the action on the object; and
    upon adjusting of the one or more operational parameters associated with the fuel cell of the autonomous vehicle to enable completion of the action on the object, performing the action on the object.

11. The method of claim 9, wherein the command to perform the one or more actions comprises an identification of a type of the one or more actions to be performed, a geographic location associated with the one or more actions to be performed, and geographic boundaries for the autonomous vehicle.

12. The method of claim 9, wherein the command to perform the one or more actions is received from a client device by a wireless receiver of the autonomous vehicle.

13. The method of claim 9, further comprising:
    upon completion of the one or more actions, causing the autonomous vehicle to travel to a determined geographic location.

14. The method of claim 9, wherein the autonomous vehicle comprises one of a skid steer or a tractor.

15. The method of claim 9, further comprising:
    receiving, by the control system from a second vehicle, data associated with the one or more actions to be performed by the autonomous vehicle, wherein adjusting the one or more operational parameters associated with the fuel cell of the autonomous vehicle to enable completion of the performance of the one or more actions is further based on the received data associated with the one or more actions from the second vehicle.

16. A non-transitory computer readable medium having instructions encoded thereon that, when executed by a processing device of a control system of an autonomous vehicle powered by a fuel cell, cause the processing device to:
    receive a command corresponding to one or more actions to be performed by the autonomous vehicle;
    in response to receiving the command, initiate performance of the one or more actions;
    provide water vapor byproduct of the fuel cell to an auxiliary system during performance of the one or more actions;

receive, from a plurality of sensors by the processing device, signals associated with surroundings of the autonomous vehicle during performance of the one or more actions; and adjust one or more operational parameters associated with the fuel cell of the autonomous vehicle to enable completion of the performance of the one or more actions based on the signals associated with the surroundings of the autonomous vehicle.

17. The non-transitory computer readable medium of claim 16, wherein the one or more actions comprises an action to be performed on an object and wherein the processing device is further to:

identify the object the action is to be performed on based on the received signals from the plurality of sensors of the autonomous vehicle, wherein the adjusting of the one or more operational parameters associated with the fuel cell of the autonomous vehicle enables completion of the action on the object; and upon adjusting of the one or more operational parameters associated with the fuel cell of the autonomous vehicle to enable completion of the action on the object, perform the action on the object.

18. The non-transitory computer readable medium of claim 16, wherein the command to perform the one or more actions comprises an identification of a type of the one or more actions to be performed, a geographic location associated with the one or more actions to be performed, and geographic boundaries for the autonomous vehicle.

19. The non-transitory computer readable medium of claim 16, wherein the command to perform the one or more actions is received from a client device by a wireless receiver of the autonomous vehicle.

20. The non-transitory computer readable medium of claim 16, wherein the processing device is further to:

upon completion of the one or more actions, cause the autonomous vehicle to travel to a determined geographic location.

21. The non-transitory computer readable medium of claim 16, wherein the autonomous vehicle comprises one of a skid steer or a tractor.

22. The non-transitory computer readable medium of claim 16, wherein the processing device is further to:

receive, from a second vehicle, data associated with the one or more actions to be performed by the vehicle.

* * * * *